United States Patent
Hindle et al.

(10) Patent No.: US 9,046,001 B2
(45) Date of Patent: Jun. 2, 2015

(54) ANNULAR BEARING SUPPORT DAMPERS, GAS TURBINE ENGINES INCLUDING THE SAME, AND METHODS FOR THE MANUFACTURE THEREOF

(75) Inventors: Timothy Hindle, Peoria, AZ (US); Tim Daniel Barber, Litchfield Park, AZ (US); Paul Buchele, Glendale, AZ (US)

(73) Assignee: HONEYWELL INTERNATIONAL INC., Morristown, NJ (US)

( * ) Notice: Subject to any disclaimer, the term of this patent is extended or adjusted under 35 U.S.C. 154(b) by 779 days.

(21) Appl. No.: 13/220,081

(22) Filed: Aug. 29, 2011

(65) Prior Publication Data

US 2013/0051982 A1   Feb. 28, 2013

(51) Int. Cl.
*F01D 25/16* (2006.01)
*F02C 7/06* (2006.01)
*F16F 15/023* (2006.01)

(52) U.S. Cl.
CPC ............... *F01D 25/164* (2013.01); *F02C 7/06* (2013.01); *F16F 15/023* (2013.01); *Y02T 50/671* (2013.01)

(58) Field of Classification Search
CPC .. F01D 25/164; F16F 15/023; F16F 15/0237; F16C 27/045; F02C 7/06
USPC .......... 415/104, 107, 119; 384/199, 535, 536, 384/581, 582; 248/636
See application file for complete search history.

(56) References Cited

U.S. PATENT DOCUMENTS

| | | | |
|---|---|---|---|
| 2,967,739 A | 1/1961 | Hoffman | |
| 3,015,523 A | 1/1962 | Semar | |
| 3,679,272 A | 7/1972 | Costa et al. | |
| 3,705,775 A | 12/1972 | Rioux | |
| 3,809,340 A | 5/1974 | Dolgy et al. | |
| 3,813,776 A | 6/1974 | Frederickson et al. | |
| 4,214,796 A | 7/1980 | Monzel et al. | |
| 4,370,094 A | 1/1983 | Ambrosch et al. | |

(Continued)

FOREIGN PATENT DOCUMENTS

| | | |
|---|---|---|
| JP | 8326557 A | 12/1996 |
| WO | 2005095822 A1 | 10/2005 |

OTHER PUBLICATIONS

GB Office Action, GB 1216644.3 dated Jan. 8, 2013.

(Continued)

*Primary Examiner* — Dwayne J White
*Assistant Examiner* — Ryan Ellis
(74) *Attorney, Agent, or Firm* — Ingrassia Fisher & Lorenz, P.C.

(57) ABSTRACT

Embodiments of a gas turbine engine are provided, as are embodiments of an annular bearing support damper and embodiments of a method for manufacturing an annular bearing support damper. In one embodiment, the gas turbine engine includes engine housing and a rotor assembly disposed within the engine housing. A rotor bearing supports the rotor assembly within the engine housing, and an annular bearing support damper is positioned between the rotor bearing and the engine housing. The support damper includes an annular housing assembly having a damping fluid annulus. An array of circumferentially-spaced damper pistons is movably coupled to the annular housing assembly and fluidly communicates with the damping fluid annulus. The damper pistons are fixedly coupled to the rotor bearing and moves in conjunction therewith to force the flow of damping fluid around the annulus during engine operation to reduce the transmissions of vibrations to the engine housing.

16 Claims, 9 Drawing Sheets

(56) References Cited

U.S. PATENT DOCUMENTS

| | | | |
|---|---|---|---|
| 4,668,108 A | 5/1987 | McHugh | |
| 4,872,767 A | 10/1989 | Knapp | |
| 4,952,076 A | 8/1990 | Wiley, III et al. | |
| 5,028,001 A | 7/1991 | Bender et al. | |
| 5,044,781 A | 9/1991 | Werner | |
| 5,065,959 A | 11/1991 | Bhatia et al. | |
| 5,088,840 A * | 2/1992 | Radtke | 384/535 |
| 5,284,011 A | 2/1994 | Von Benken | |
| 5,305,981 A | 4/1994 | Cunningham et al. | |
| 5,332,070 A | 7/1994 | Davis et al. | |
| 5,421,655 A * | 6/1995 | Ide et al. | 384/99 |
| 5,484,120 A | 1/1996 | Blakeley et al. | |
| 5,501,531 A * | 3/1996 | Hamaekers | 384/536 |
| 5,531,522 A | 7/1996 | Ide et al. | |
| 5,603,574 A | 2/1997 | Ide et al. | |
| 5,613,781 A | 3/1997 | Kuzdzal et al. | |
| 5,810,319 A | 9/1998 | von Flotow et al. | |
| 5,947,240 A | 9/1999 | Davis et al. | |
| 5,947,457 A | 9/1999 | Swanson et al. | |
| 6,002,778 A | 12/1999 | Rossetti et al. | |
| 6,155,720 A | 12/2000 | Battig | |
| 6,325,327 B1 | 12/2001 | Zoppitelli et al. | |
| 6,325,546 B1 | 12/2001 | Storace | |
| 6,328,293 B1 | 12/2001 | Olsen | |
| 6,394,387 B1 * | 5/2002 | Mitrovic | 244/17.11 |
| 6,499,209 B1 | 12/2002 | Landin et al. | |
| 6,682,219 B2 | 1/2004 | Alam et al. | |
| 6,789,998 B2 | 9/2004 | Chen et al. | |
| 6,806,604 B2 | 10/2004 | Werfel et al. | |
| 6,883,967 B2 | 4/2005 | Robb et al. | |
| 6,935,591 B2 | 8/2005 | Udall | |
| 7,066,651 B2 | 6/2006 | Nicholas et al. | |
| 7,093,806 B2 | 8/2006 | Osterberg | |
| 7,121,729 B2 | 10/2006 | Davis et al. | |
| 7,182,188 B2 | 2/2007 | Ruebsamen | |
| 7,384,199 B2 | 6/2008 | Allmon et al. | |
| 7,445,094 B1 | 11/2008 | Henderson et al. | |
| 7,524,112 B2 | 4/2009 | Gerez et al. | |
| 7,625,121 B2 | 12/2009 | Pettinato et al. | |
| 7,631,839 B1 | 12/2009 | Duncan et al. | |
| 7,731,426 B2 | 6/2010 | Meacham et al. | |
| 7,845,158 B2 | 12/2010 | Udall | |
| 7,878,448 B2 | 2/2011 | Olsen et al. | |
| 7,950,633 B2 | 5/2011 | Hiley et al. | |
| 8,001,764 B2 | 8/2011 | Parks et al. | |
| 8,256,750 B2 * | 9/2012 | Cottrell et al. | 267/136 |
| 8,794,912 B2 | 8/2014 | Nilsson et al. | |
| 2003/0132077 A1 | 7/2003 | Davis | |
| 2004/0004161 A1 | 1/2004 | Osterberg | |
| 2004/0245403 A1 | 12/2004 | Osterberg | |
| 2005/0217954 A1 | 10/2005 | Hindle et al. | |
| 2006/0204153 A1 | 9/2006 | Alam et al. | |
| 2008/0148708 A1 | 6/2008 | Chou et al. | |
| 2009/0020381 A1 | 1/2009 | Hindle et al. | |
| 2009/0110572 A1 | 4/2009 | Meacham et al. | |
| 2009/0148271 A1 | 6/2009 | Alvanos et al. | |
| 2009/0183512 A1 | 7/2009 | Suciu et al. | |
| 2010/0207007 A1 | 8/2010 | Cottrell et al. | |
| 2013/0051981 A1 | 2/2013 | Hindle et al. | |
| 2013/0051982 A1 | 2/2013 | Hindle et al. | |
| 2013/0067931 A1 | 3/2013 | Hindle et al. | |

OTHER PUBLICATIONS

USPTO Office Action, Notification Date Apr. 30, 2014; U.S. Appl. No. 13/219,287.
USPTO Office Action, Notification Date Aug. 25, 2014; U.S. Appl. No. 13/219,287.
USPTO Office Action, Notification Date Oct. 23, 2014; U.S. Appl. No. 13/358,239.
USPTO Final Office Action, Notification Date Nov. 6, 2014; U.S. Appl. No. 13/239,115.
USPTO Notice of Allowance, Notification Date Nov. 24, 2014; U.S. Appl. No. 13/219,287.
USPTO Office Action, Notification Date Jun. 10, 2014; U.S. Appl. No. 13/239,115.
USPTO Office Action, Notification Date Feb. 11, 2015; U.S. Appl. No. 13/358,239.

* cited by examiner

ANNULAR BEARING SUPPORT DAMPERS, GAS TURBINE ENGINES INCLUDING THE SAME, AND METHODS FOR THE MANUFACTURE THEREOF

TECHNICAL FIELD

The present invention relates generally to vibration dampers and, more particularly, highly compact, annular bearing support dampers well-suited for usage within gas turbine engines and other turbomachinery.

BACKGROUND

Vibrations emitted from rotating components included with gas turbine engines can reduce passenger comfort and degrade various aspects of engine performance, including thrust output and fuel efficiency. Additionally, rotating components can experience excessive vibrations when rotated at specific speeds that align with rotor system flexible mode frequencies, possibly resulting in degraded system performance or damage to components. It is thus desirable to damp such vibrations prior to transmission to the aircraft fuselage and, preferably, prior to transmission to the engine's static infrastructure or housing. It is also desirable to damp vibrations to limit the response at rotor system flexible mode frequencies to maximize system performance and avoid potential damage to the system. For these reasons, modern gas turbine engine are commonly equipped with squeeze film dampers ("SFDs"), which are mounted around one or more of the rotor bearings to reduce the response at rotor system flexible modes, as well as to reduce transmission of vibrations to the engine housing. A squeeze film damper typically includes an inner journal and an damper outer housing, which are affixed to the rotor bearing and to the engine housing, respectively. The inner circumferential surface of the journal is radially spaced from outer circumferential surface of the damper housing to define an annulus, which is filled with a damping fluid. In the normal or design position, the journal and the damper housing are generally concentric and the width of the annulus is constant. However, during engine operation, the journal moves in conjunction with the rotor bearing relative to the damper housing and the static engine infrastructure. As the journal moves between different eccentric positions along an orbital or whirl-type motion path, the geometry of the annulus changes. Damping fluid is continually displaced by the dimensional changes in the damping fluid annulus, and the transmission of vibrations through the SFD and to the engine housing are damped by viscous losses and fluid shearing.

SFDs provide vibration attenuation in a relatively compact and lightweight package well-suited for deployment within a gas turbine engine. SFDs are, however, limited in several respects. First, SFDs are active hydraulic devices requiring lubricant supplies and plumbing, which adds undesired part count, complexity, and cost to the gas turbine engine. Second, the stiffness and damping profiles of an SFD are highly non-linear and difficult to predict. Thus, while a given SFD can be tuned to provide peak damping at a frequency corresponding to a targeted engine critical mode, the SFD will provide less-than-optimal damping at other operational frequencies and engine critical modes. Furthermore, as the engine critical modes vary in conjunction with changing rotor imbalances, SFDs may gradually become less effective at attenuating vibrations over the operational lifespan of a gas turbine engine. As a further limitation, the stiffness and damping profiles of an SFD are inherently linked and cannot be independently tuned. As a result, it can be difficult to optimize the damping characteristics of an SFD without reducing stiffness and sacrificing some degree of rotor centerline control. Poor centerline control decreases the ability of the SFD to counteract static loading conditions (e.g., gravity sag or maneuver loads) and generally requires the provision of larger tip clearances within the gas turbine engine, which reduces overall engine efficiency. Moderate improvements in the linearity of the SFD damping and stiffness profiles can be realized through the addition of a centering spring; however, spring-centered SFDs still provide less-than-ideal stiffness and damping profiles and remain limited by the other drawbacks noted above.

There thus exists an ongoing need to provide embodiments of a bearing support damper suitable for usage within gas turbine engine and other turbomachinery that overcomes most, if not all, of the above-noted limitations. In particular, it would be desirable to provide a bearing support damper that provides substantially linear stiffness and damping profiles over a relatively broad frequency and amplitude ranges, and that does not require an active lubricant supply. Ideally, embodiments of such a bearing support damper would have a highly compact envelope to facilitate incorporation of the bearing support damper into existing gas turbine engine platforms. It would also be desirable to provide embodiments of a gas turbine engine including such a bearing support damper, as well as methods for the manufacture of a bearing support damper. Other desirable features and characteristics of embodiments of the present invention will become apparent from the subsequent Detailed Description and the appended Claims, taken in conjunction with the accompanying drawings and the foregoing Background.

BRIEF SUMMARY

Embodiments of a gas turbine engine are provided. In one embodiment, the gas turbine engine includes an engine housing, a rotor assembly disposed within the engine housing, and a rotor bearing supporting the rotor assembly within the engine housing. An annular bearing support damper is positioned between the rotor bearing and the engine housing. The support damper includes an annular housing assembly fixedly coupled to the engine housing, a damping fluid annulus formed within the annular housing assembly and fillable with a damping fluid, and an array of circumferentially-spaced damper pistons movably coupled to the annular housing assembly and in fluid communication with the damping fluid annulus. The array of circumferentially-spaced damper pistons is fixedly coupled to the rotor bearing and moves in conjunction therewith to force the flow of damping fluid around the damping fluid annulus during operation of the gas turbine engine to reduce the transmissions of vibrations to the engine housing.

Embodiments of an annular bearing support damper configured to be positioned between a static structure and a bearing supporting a rotating component are further provided. In one embodiment, the annular damping support includes an annular housing assembly configured to be fixedly coupled to the static structure, a damping fluid annulus formed within the annular housing assembly and fillable with a damping fluid, and an array of circumferentially-spaced damper pistons movably coupled to the annular housing assembly and in fluid communication with the damping fluid annulus. The array of circumferentially-spaced damper pistons is configured to be fixedly coupled to the bearing and to move in conjunction therewith to force the flow of damping fluid around the damping fluid annulus during rotation of the rotating component to dampen vibrations transmitted between the bearing and the static structure.

Embodiments of a method for manufacturing an annular bearing support damper are further provided. In one embodiment, the method includes the steps of providing an annular housing assembly having a damping fluid annulus, placing an array of circumferentially-spaced damper pistons in fluid communication with the damping fluid annulus, and sealingly coupling a plurality of bellows between the annular housing assembly and the array of circumferentially-spaced damper pistons.

BRIEF DESCRIPTION OF THE DRAWINGS

At least one example of the present invention will hereinafter be described in conjunction with the following figures, wherein like numerals denote like elements, and.

DETAILED DESCRIPTION

The following Detailed Description is merely exemplary in nature and is not intended to limit the invention or the application and uses of the invention. Furthermore, there is no intention to be bound by any theory presented in the preceding Background or the following Detailed Description.

The following describes exemplary embodiments of an annular bearing support damper that functions as a multi-axis three parameter device to provide substantially linear damping and stiffness profiles in multiple degrees of freedom and, specifically, in all radial directions relative to a bearing nested within the support damper. Advantageously, the annular bearing support damper is a passive hydraulic device, which does not require an active lubricant supply and plumbing. In addition, the annular bearing support damper is highly compact and lightweight. For these reasons, embodiments of the annular bearing support damper are especially well-suited for deployment within a gas turbine engine and will consequently be described below as such. This preferred application notwithstanding, it is emphasized that embodiments of the annular bearing support described herein are by no means limited to usage within any particular application and may instead be utilized within any rotating machine wherein controlled, linear bearing stiffnesses and damping properties are desired at bearing support locations to optimize rotor-dynamics and centerline control of a rotor assembly. As a specific example, embodiments of the annular bearing support damper are also well-suited for usage within other types of turbomachinery, such as turbochargers.

Figure 1:
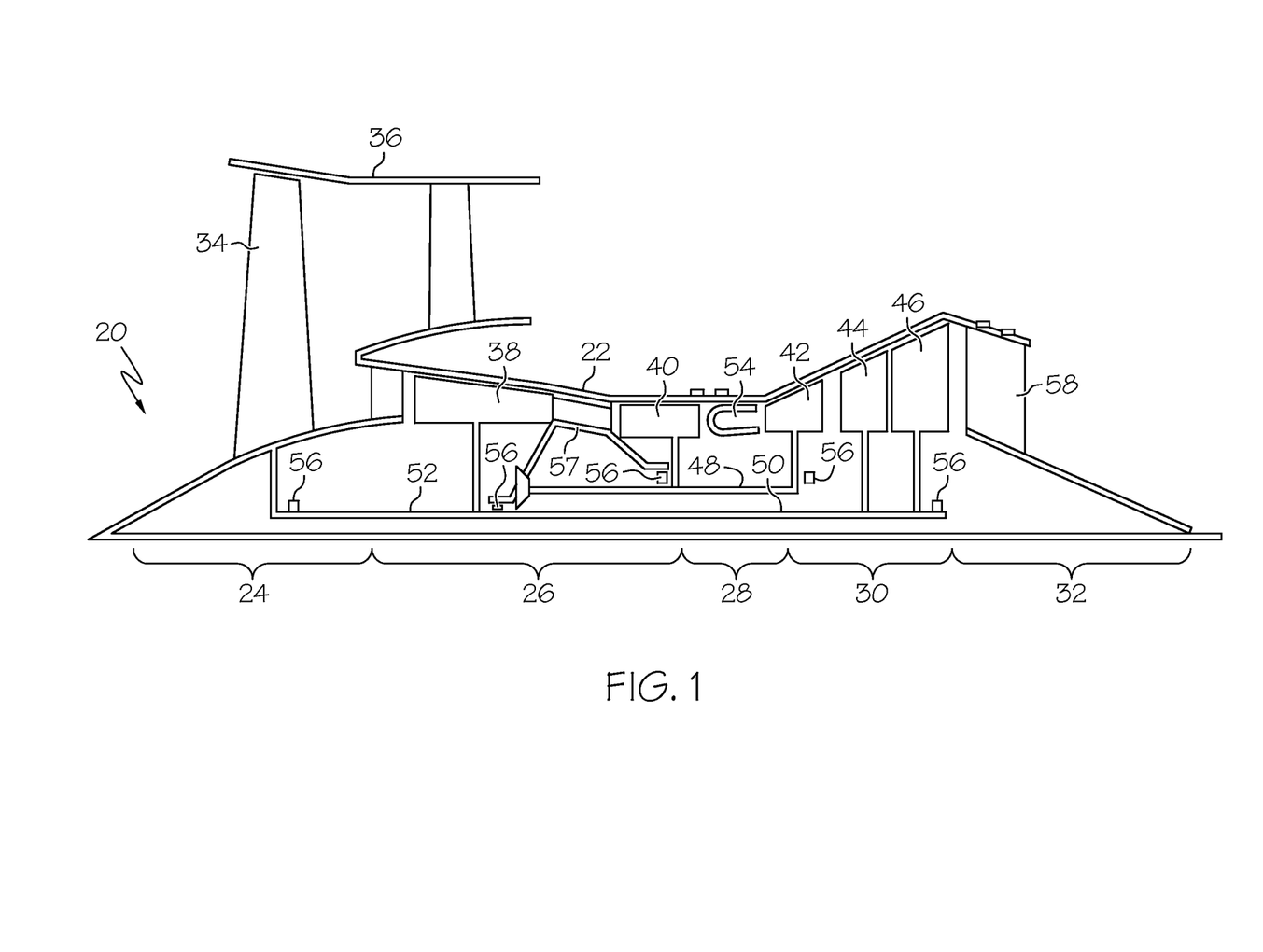
FIG. 1 is a functional schematic of an exemplary gas turbine engine including a number of rotor bearings.

FIG. 1 is a functional schematic of a gas turbine engine (GTE) 20 illustrated in accordance with an exemplary embodiment. By way of example, GTE 20 is illustrated in FIG. 1 as a three spool turbofan engine including an engine case 22, an intake section 24, a compressor section 26, a combustion section 28, a turbine section 30, and an exhaust section 32. Intake section 24 includes a fan 34 mounted in a fan case 36. Compressor section 26 includes one or more compressors (e.g., an intermediate pressure (IP) compressor 38 and a high pressure (HP) compressor 40), and turbine section 30 includes one or more turbines (e.g., an HP turbine 42, an IP turbine 44, and a low pressure (LP) turbine 46) disposed in axial flow series. HP compressor 40 and HP turbine 42 are mounted on opposing ends of an HP shaft or spool 48; IP compressor 38 and IP turbine 44 are mounted on opposing ends of IP spool 50; and fan 34 and LP turbine 46 are mounted on opposing ends of a LP spool 52. LP spool 52, IP spool 50, and HP spool 48 are co-axial. That is, LP spool 52 may extend through a longitudinal channel provided through IP spool 50, and IP spool 50 may extend through a longitudinal channel provided through HP spool 48. A plurality of rotor bearings 56 are disposed around LP spool 52, IP spool 50, and HP spool 48 at various locations to facilitate high speed rotation of spools 48, 50, and 52 during engine operation. Although by no means limited to a particular construction, rotor bearings 56 will each typically assume the form of a rolling element bearing, such as a ball bearing or a roller bearing, which may or may not be disposed within an outer sleeve or cartridge. Bearings 56 are mounted to various inner walls or other non-rotating structural elements or infrastructure provided within GTE 20, which are partially and generically illustrated in FIG. 1 at 57. Such non-rotating structural elements, along with engine case 22, are collectively referred hereto as "the engine housing." Spools 48, 50, and 52 and those component mounted thereto and driven thereby are collectively referred to herein as a "rotor assembly."

As illustrated in FIG. 1 and described herein, GTE 20 is offered by way of example only. It will be readily appreciated that embodiments of the present invention are equally applicable to various other types of gas turbine engine including, but not limited to, other types of turbofan, turboprop, turboshaft, and turbojet engines. Furthermore, the particular structure of GTE 20 will inevitably vary amongst different embodiments. For example, in certain embodiments, an open rotor configuration may be employed wherein fan 34 is not mounted within an outer fan case. In other embodiments, GTE 20 may employ radially disposed (centrifugal) compressors instead of axial compressors. The number, disposition, and type of rotor bearings 56 will also inevitably vary amongst different embodiments of GTE 20 depending upon various design parameters including, for example, the number of spools included within GTE 20. While primarily described below as deployed onboard an aircraft, GTE 20 is by no means limited to deployment onboard any particular platform and may also be deployed onboard other types of vehicles (e.g., watercraft and ground vehicles, such as tanks), included within auxiliary power units, or included within industrial power generators.

During operation of GTE 20, air is drawn into intake section 24 and accelerated by intake fan 34. A portion of this accelerated air is directed through a bypass section disposed between fan case 36 and an engine cowl (also not shown) to generate forward thrust. The remaining portion of air exhausted from fan 34 is directed into compressor section 26 and compressed by IP compressor 38 and HP compressor 40. The compressed air then flows into combustion section 28 wherein the air is mixed with fuel and combusted by a plurality of combustors 54 (only one of which is shown in FIG. 1). The combusted air expands rapidly and flows through turbine section 30 thereby rotating turbines 42, 44, and 46. The rotation of turbines 42, 44, and 46 (and, therefore, of spools 48, 50, and 52) drives the rotation of HP compressor 40, IP compressor 38, and fan 34, respectively. Finally, after passing through turbine section 30, the air is exhausted through an exhaust nozzle 58 mounted in exhaust section 32 to provide addition forward thrust.

Due to rotor imbalances, bearing imperfections, and the like, vibrations are produced during rotation of spools 48, 50, and 52 and transmitted through rotor bearings 56, through the engine housing, and ultimately to the aircraft fuselage. As noted above, vibration of the rotating components can transmit vibrations to the cabin and decrease passenger comfort, detract from engine performance, and limit the operational lifespan of the rotor bearings and other engine components. Therefore, to minimize vibrations of the rotating components as well as vibrations from rotor bearings 56 to the engine housing, GTE 20 is further equipped with at least one annular damper bearing support (not shown in FIG. 1) disposed around at least one of rotor bearings 56. As opposed to a conventional spring-centered squeeze film damper, the annular damper bearing support provides is a passive hydraulic device that provides substantially linear damping and stiffness profile over the operational range of GTE 20. A first example of an annular bearing support damper is described below in conjunction with FIGS. 2-7, and a second example of an annular bearing support damper is described below in conjunction with FIGS. 8 and 9.

Figure 2:
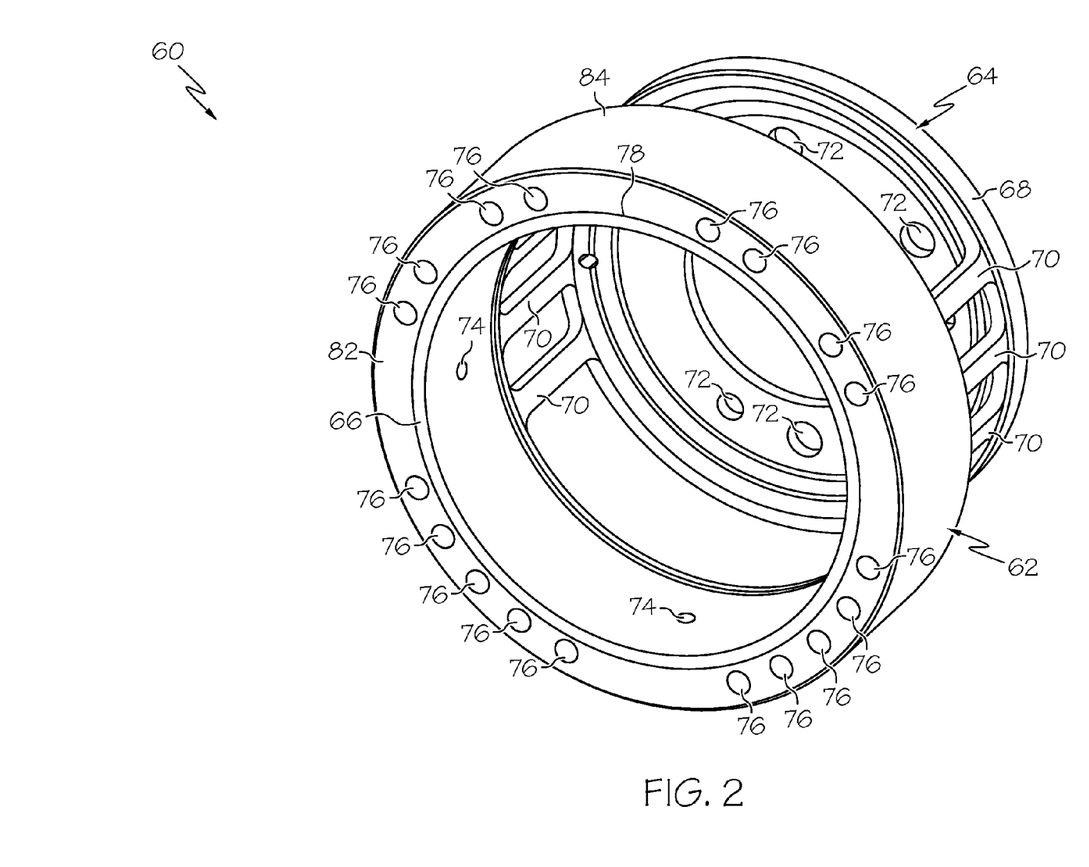
FIGS. 2 and 3 are isometric and exploded views, respectively, of an annular bearing support damper suitable for usage within the gas turbine engine shown in FIG. 1 and illustrated in accordance with an exemplary embodiment of the present invention.

FIG. 2 is an isometric view of an annular bearing support damper 60 illustrated in accordance with an exemplary embodiment of the present invention. Annular bearing support damper 60 includes an annular housing assembly 62 and a centering spring 64. As indicated in FIG. 2, centering spring 64 may assume the form of a tubular spring cage (also commonly referred to as a "squirrel cage") having a floating end portion 66 and an opposing fixed end portion 68. A number of axially-extending flex beams 70 connect floating end portion 66 to fixed end portion 68. When installed within GTE 20 (FIG. 1), fixed end portion 68 is affixed to or otherwise mounted to a mounting structure included within the engine housing. For example, fixed end portion 68 can be machined to include a plurality of apertures 72, which receive a plurality of bolts or other such fasteners (not shown) to attach fixed end portion 68 to an inner wall within the gas turbine engine. Flex beams 70 impart centering spring 64 with a high degree of axial stiffness, but allow spring 64 to deflect in a radial direction to permit relative movement between fixed end portion 68 and floating end portion 66 during engine operation. In the illustrated example, flex beams 70 are generally grouped at 3' clock and 9' clock positions and each have rectangular cross-sectional geometry to impart centering spring 64 with a greater stiffness in the vertical direction than in the horizontal direction. Centering spring 64 may be similar to the centering springs utilized in conjunction within conventional spring-centered squeeze film dampers; and, in certain embodiments, centering spring 64 may be produced from a readily-available squeeze film damper centering spring by secondary machining, as described more fully below.

In contrast to fixed end portion 68, floating end portion 66 of centering spring 64 is not directly attached to the static engine structure and is instead fixedly coupled to an array of circumferentially-spaced damper pistons including within support damper 60 (hidden from view in FIG. 2 by housing assembly 62 and described below in conjunction with FIGS. 3, 5, and 6). Floating end portion 66 of centering spring 64 is sized and shaped to matingly receive a rotor bearing therein, such as one of bearings 56 generically shown in FIG. 1. During assembly, the rotor bearing is matingly inserted into the cylindrical opening defined by floating end portion 66 such the outer circumferential surface of the outermost component of the rotor bearing (e.g., the outer ring) contacts the inner circumferential surface of floating end portion 66. The rotor bearing may be retained within floating end portion 66 utilizing any suitable capture method or means including, for example, a thermal fit technique of the type described below. Although not shown in FIG. 2 for clarity, at least one rotating shaft or spool (e.g., spools 48, 50, and/or 52 shown in FIG. 1) extends through the longitudinal channel of centering spring 64, through bearing support damper 60, and through the rotor bearing nested within floating end portion 66. The rotor bearing supports the spool (or co-axial spools) extending through bearing support damper 60. Due to the radial compliance of centering spring 64, the rotor bearing is able to move radially within respect to the engine housing in conjunction with the rotor bearing and the rotor assembly. Centering spring 64 resiliently biases floating end portion 66, and therefore the rotor bearing and rotor assembly, to return to the engine centerline position after radial displacement to help maintain optimal positioning of the rotor assembly during engine operation.

When support damper 60 is installed within a gas turbine engine, annular housing assembly 62 is mounted to an internal static structure included within the engine housing. In the illustrated example, a plurality of openings 76 is provided in the radial face of housing assembly 62 to enable housing assembly 62 to be bolted to corresponding mounting structure (e.g., a mating inner wall) provided within the gas turbine engine. Notably, only a limited number of openings 76 may be attached to gas turbine engine in this manner, while the other openings 76 may be provided in annular housing assembly 62 solely for weight reduction purposes. A relatively small annular clearance or radial gap 78 is provided between the inner circumferential wall of annular housing assembly 62 and the outer surface annular surface of floating end portion 66 of centering spring 64. Radial gap 78 enables radial movement of floating end portion 66, and therefore radial movement of the non-illustrated bearing captured by floating end portion 66, relative to annular housing assembly 62 and the static engine infrastructure or housing. Although the width of gap 78 may be relatively narrow (e.g., on the order of a few thousands of an inch), only a limited amount of radial displacement is required between floating end portion 66 and annular housing assembly 62 in view of the relatively high stiffness and linear damping characteristics provided by annular bearing support damper 60.

Figure 3:
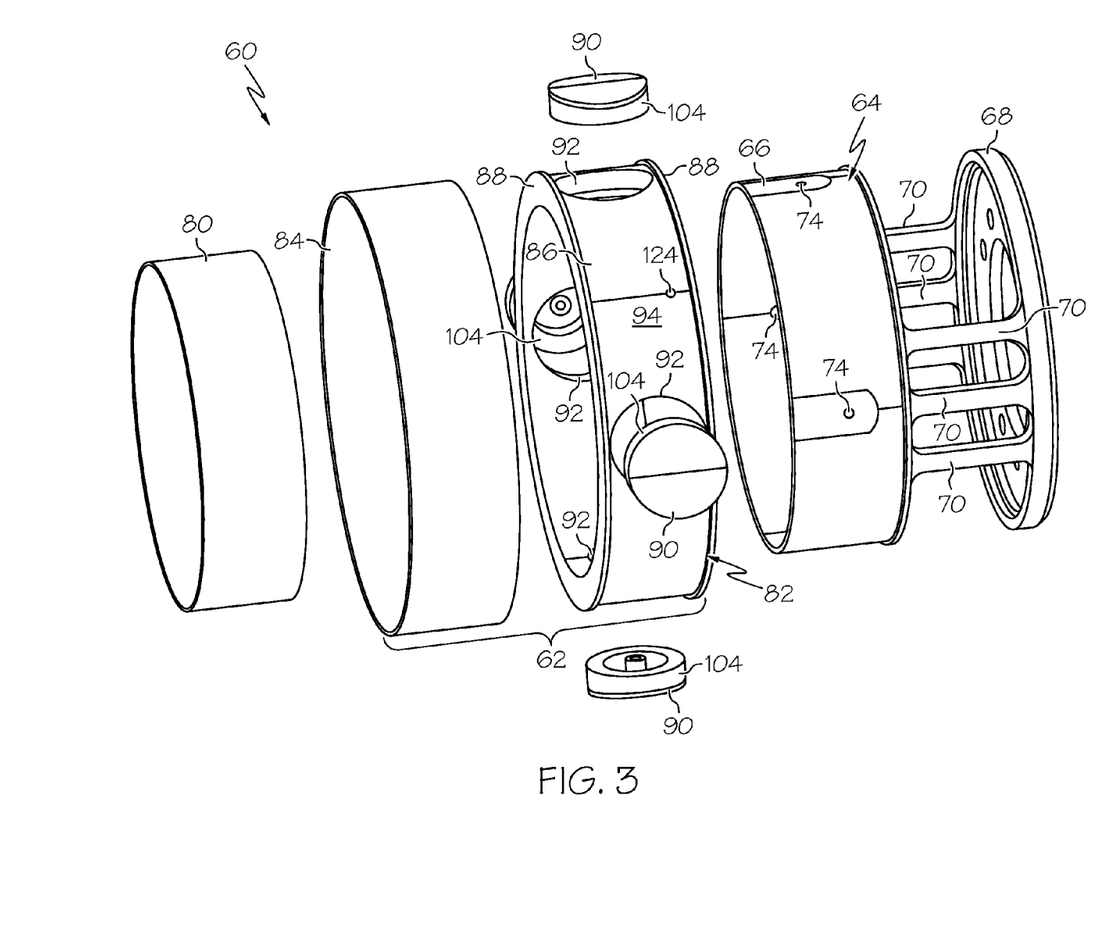

FIG. 3 is an exploded view of annular bearing support damper 60 and an inner annular member 80, which may be positioned within floating end portion 66 of centering spring 64. Inner annular member 80 preferably serves as the outer ring of the rotor bearing nested within bearing support damper 60, although inner annular member 80 may instead serve as an intervening structural element (e.g., an adapter sleeve) positioned between floating end portion 66 and the rotor bearing retained within floating end portion 66. Annular housing assembly 62 is assembled from two mating pieces, namely, an annular housing centerpiece 82 and an annular cover piece 84. Annular housing centerpiece 82 includes an inner ring portion 86 and two opposing sidewalls 88. Opposing sidewalls 88 extend radially outward from inner ring portion 86 to laterally bound an annular channel, which circumscribes inner ring portion 86 of housing centerpiece 82. During assembly, cover piece 84 is positioned around and encloses annular housing centerpiece 82 to define a damping fluid annulus 94 within annular housing assembly 62. To create a hermetic or at least a liquid-tight seal enclosing annulus 94, cover piece 84 may be welded to the outer circumferential edges of sidewalls 88 during assembly. As housing centerpiece 82 and cover piece 84 are fixedly joined in concentric relationship, the geometry of damping fluid annulus 94 will remain constant throughout the operation of bearing damper 60 in contrast to the variable-geometry annulus of a conventional squeeze film damper. Damping fluid annulus 94 may have a rectangular cross-sectional geometry, as taken along a longitudinal plane through support damper 60, with the axial width of annulus 94 being several times greater than the radial height of annulus 94.

Figure 4:
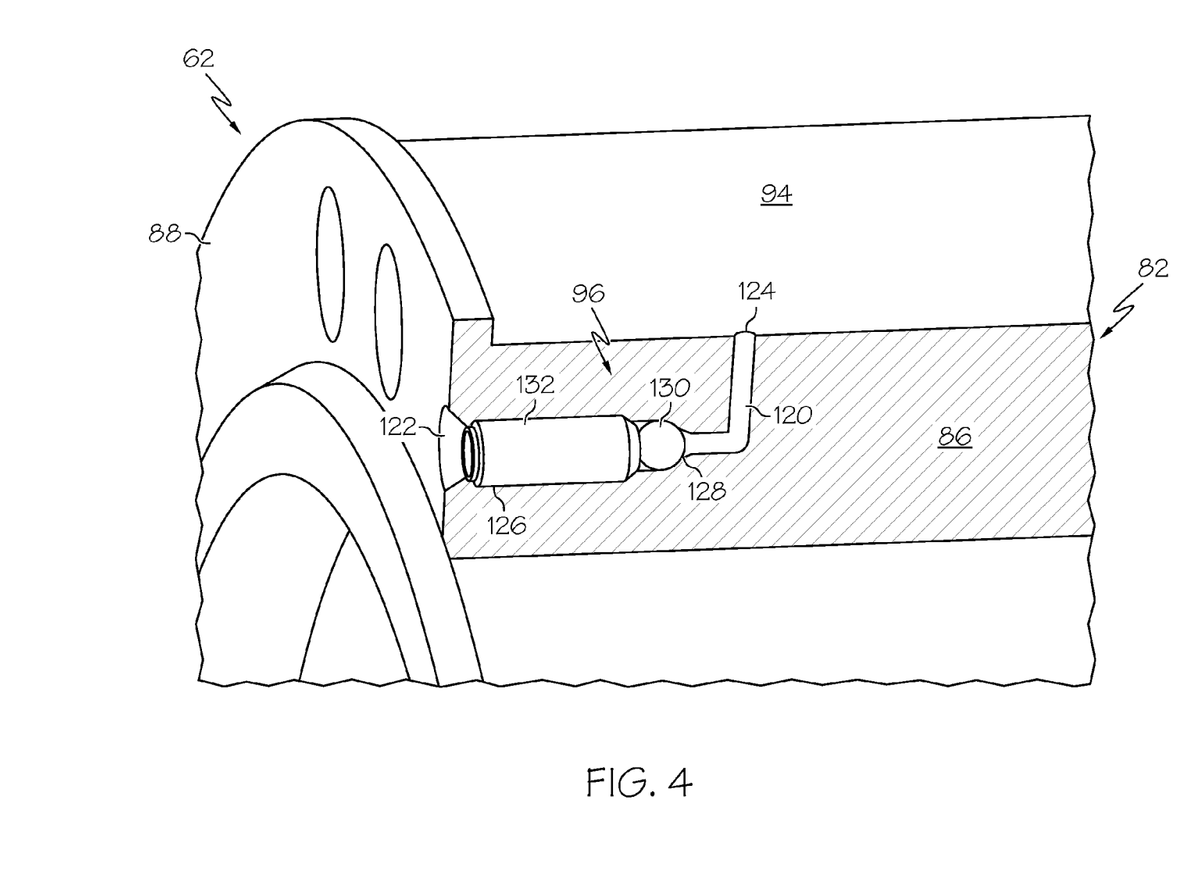
FIG. 4 is a cross-sectional view of a portion of the annular bearing support damper shown in FIGS. 2 and 3 illustrating an exemplary fill port device.

To enable annulus 94 to be filled with a damping fluid, such as a silicon-based oil, support damper 60 is further equipped with a fill port device. FIG. 4 is a cross-sectional view of housing centerpiece 82 illustrating an exemplary fill port device 96 including a fill channel 120 formed in housing centerpiece 82. Fill channel 120 includes, in turn, an inlet 122, an outlet 124, and an enlarged throat 126, which tapers radially inward to form a conical seat 128. Inlet 122 is formed through sidewall 88 of housing centerpiece 82 to permit manual access from the exterior of housing assembly 62, while outlet 124 is formed in the outer circumferential surface of inner ring portion 86 to direct damping fluid into damping fluid annulus 94. After filling of damping fluid annulus 94, fill channel 120 is sealed by, for example, deformation of a compressible element 130 (e.g., a copper ball) against conical seat 128. As indicated in FIG. 4, compressible element 130 may be sealingly deformed against conical seat 128 to by turning of a set screw 132, which is positioned within and threadably engages enlarged throat 126. Although not shown in FIGS. 2-4 for clarity, annular bearing support damper 60 may also include a thermal compensation system (e.g., a spring-loaded plunger or an internal bellows) to accommodate volumetric changes in damping fluid due to temperature changes in the fluid during gas turbine engine operation.

Referring once again to FIGS. 2 and 3, an array of damper pistons 90 is spaced around the circumference support damper 60 at predetermined angular intervals. Damper pistons 90 are received within a plurality of radial openings 92 provided through inner ring portion 86 of housing centerpiece 82. Radial openings 92 allow damper pistons 90 to be positioned such that the innermost end portion of each piston 90 can be directly affixed to floating end portion 66 of centering spring 64, while the opposing end portion of each piston (i.e., the head) is positioned through inner ring member 86 of housing centerpiece 82 and, thus, is exposed to the damping fluid within annulus 94. As will be described below in conjunction with FIGS. 5 and 6, damper pistons 90 are fixedly attached to floating end portion 66 and move in conjunction therewith relative to annular housing assembly 62 and the static engine infrastructure. Movement of floating end portion 66 in a given radial direction will result in both translational and lateral movement of pistons 90 within their respective openings 92. A plurality of bellows 104 is sealingly joined between damper pistons 90 and housing centerpiece 82 to prevent damping fluid leakage from annulus 94 while permitting translational and lateral movement of pistons 90, as further described below in conjunction with FIGS. 5 and 6.

Figure 5:
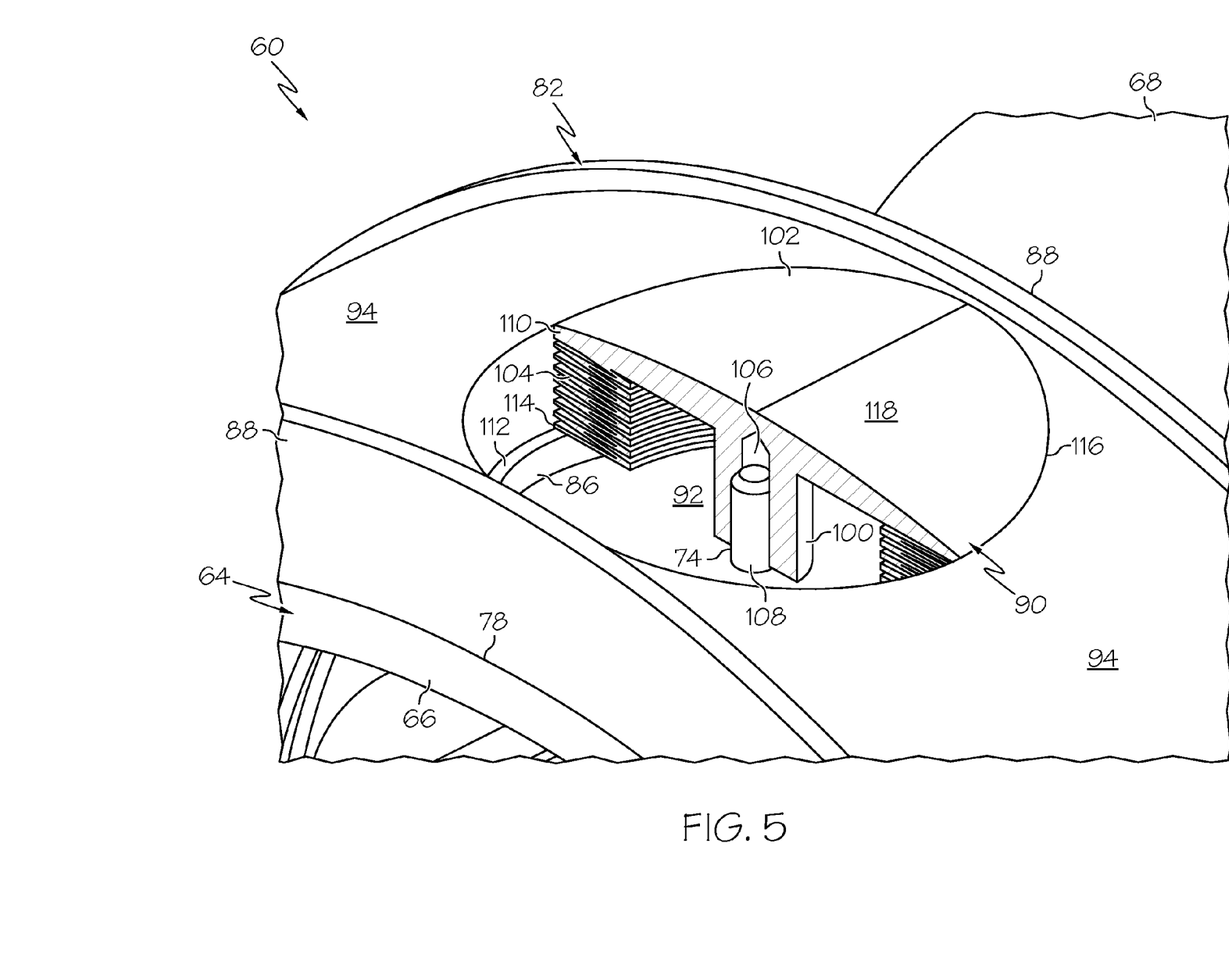
FIGS. 5 and 6 are cutaway and cross-sectional views, respectively, of a portion of the annular bearing support damper shown in FIGS. 2-4 illustrating a damper piston included within the support damper greater detail.
Figure 6:
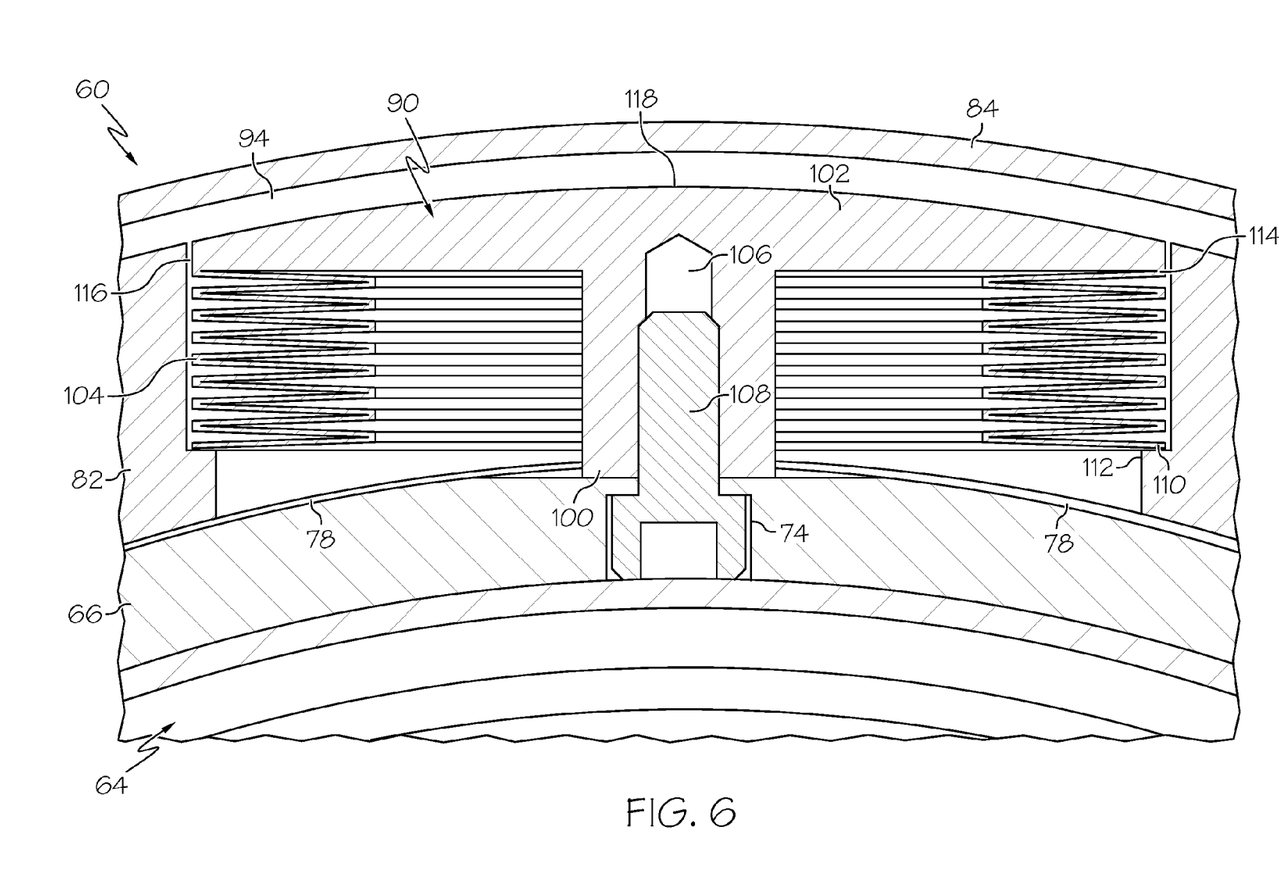

FIGS. 5 and 6 are cutaway and cross-sectional views, respectively, of a portion of annular support damper 60 (cover piece 84 not shown) illustrating one damper piston 90 and its corresponding bellows 104 in greater detail. As can be seen, damper piston 90 includes a piston shaft 100 and a piston cap 102, which is affixed to the radially-outer end of shaft 100. The end of piston shaft 100 opposing piston cap 102 is affixed to floating end portion 66 of centering spring 64. The particular manner in which piston shaft 100 is attached to floating end portion 66 will vary amongst different embodiments. For example, a plurality of fastener openings 74 may be provided through floating end portion 66, which aligns with shafts 100 when annular housing assembly 62 is properly positioned or clocked with respect to floating end portion 66. A plurality of fasteners 108 (e.g., a socket head screw cap) is then disposed openings 74 and into bores 106 provided in piston shafts 100 to affix damper pistons 90 to floating end portion 66 of centering spring 64. Such an attachment interface allows damper pistons 90 to be pushed and pulled by floating end portion 66 of centering spring 64 as floating end portion 66 moves radially.

Piston cap 102 has a working surface 118, which is exposed to and thus fluidly communicates with the damping fluid contained within annulus 94. In the exemplary embodiment, piston cap 102 assumes the form of a disc-shaped body having a circular planform geometry generally conformal with the geometry of radial opening 92 provided in inner ring portion 86 of housing centerpiece 82. A relatively narrow annular gap or circumferential clearance 116 is provided around piston cap 102 to permit lateral movement of piston 90 within opening 92. In the illustrated example, working surface 118 is substantially flush with the outer circumferential surface of inner ring portion 86, and thus partially bounds the inner circumference of damping fluid annulus 94, when annular support damper 60 resides in the normal or design position. Working surface 118 is preferably provided with a gently sloped, convex outer geometry (shown most clearly in FIG. 6) to provide a substantially uninterrupted transition as damping fluid flows over the outer circumferential surface of inner ring portion 86 and across working surface 118.

Bellows 104 sealingly couples piston cap 102 to housing centerpiece 82 and, specifically, sealing joins the underside of piston cap 102 to the inner circumferential surface of centerpiece 82 defining the opening 92 in which damper piston 90 is housed. As indicated at 110, the radially-inner edge of bellows 104 may be sealingly joined to an inner circumferential shelf 112 provided in opening 92 by way of a first circumferential weld joint. Similarly, the radially-outer edge of bellows 104 may be sealingly joined to the underside of piston cap 102 by way of a second circumferential weld joint. In the illustrated example, bellows 104 is externally pressurized; that is, the outer surface of bellows 104 is exposed to the damping fluid within annulus 94, while the inner surface of bellows 104 is exposed to ambient air. As was the case with piston cap 102, a circumferential clearance 116 is provided around bellows 104 to permit lateral deflection. The lateral and axial stiffnesses of bellows 104 can be tuned, as desired, through the selection of the materials from which bellows 104 is fabricated, variations in wall thickness, and variations in the number of convolutes included within the bellows. Bellows 104 is preferably, although not necessarily, formed from a relatively lightweight metal or alloy having a relatively high thermal tolerance.

In the exemplary embodiment shown in FIGS. 2-5, and as shown most clearly in FIGS. 2 and 3, annular bearing support damper 60 includes four damper pistons 90 and four corresponding bellows 104, which are symmetrically arranged about the centerline of damper 60 and spaced apart at intervals of approximately 90 degrees. As a result of this structural arrangement, two damper pistons 90 are placed in a diametrically-opposed or antagonistic relationship along a first diameter of bearing support damper 60, while two damper pistons 90 are placed in a diametrically-opposed or antagonistic relationship along a second diameter of bearing support damper 60 substantially perpendicular to the first diameter. Stated differently, bearing support damper 60 includes two pairs of opposing pistons 90 positioned along first and second perpendicular axes, which are substantially orthogonal to the centerline of damper 60 and, more generally, to the centerline of GTE 20 (shown in FIG. 1). As noted above, a circumferential clearance is provided between each damper piston 90 and the interior of its corresponding opening 92 to permit limited lateral movement of pistons 90. In this manner, a given pair of diametrically-opposed pistons 90 is able to deflect in a lateral direction to accommodate axial movement (extension and retraction) of the other pair of diametrically-opposed pistons 90 as floating end portion 66 of centering spring 64 moves in any particular radial direction. In further embodiments, annular bearing support damper 60 can include a greater or lesser number of pistons and bellows, which may or may not be spaced about the circumference of damper 60 at regular intervals.

Movement of floating end portion 66 of centering spring 64, and more generally movement of the bearing retained within floating end portion 66 and the spool supported thereby, in any given radial direction will thus result in the axial movement of at least one damper piston 90 away from the centerline of bearing support damper 60 and the simultaneous axial movement of the opposing damper piston 90 toward the centerline of bearing support damper 60. As a given damper piston(s) 90 moves axially toward the centerline of damper 60, the piston cap 102 of the damper piston 90 encroaches or extends into annulus 94 thereby displacing a certain volume of damping fluid. At the same time, the opposing damper piston moves axially away from the centerline of damper 60 and, in so doing, retracts into its radial opening 92 to accommodate or take-up the displaced damping fluid. Movement of damper pistons 90 consequently forces the flow of damping fluid around damping fluid annulus 94 to dampen vibrations transmitted from the rotor bearing to the surrounding engine infrastructure. As the geometry of annulus 94 remains constant, and as the range of motion of pistons 90 is relatively limited, annular support damper 60 is able to provide such damping in a manner that remains substantially uniform or linear over the operational frequency and amplitude range of GTE 20 (FIG. 1). Housing centerpiece 82 and floating end portion 66 of centering spring 64 may be configured to contact to provide a hardstop limiting the displacement of floating end portion 66 and damper pistons 90 in any given radial direction to a predetermined maximum threshold.

Figure 7:
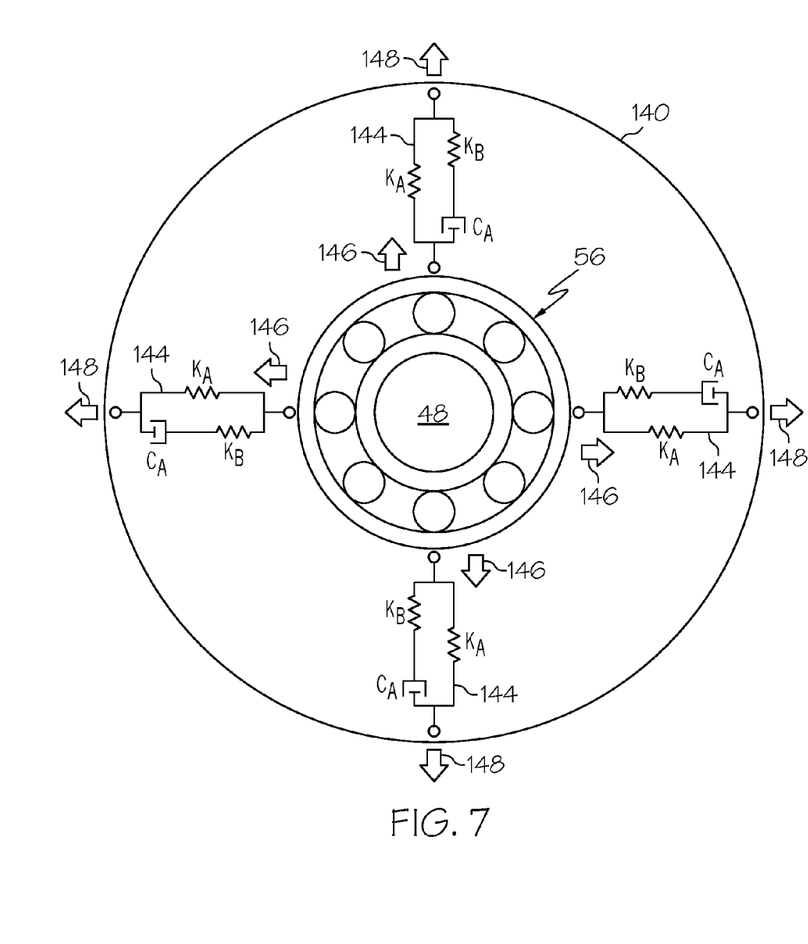
FIG. 7 is a functional schematic illustrating the manner in which the annular bearing support damper shown in FIGS. 2-6 functions as a multi-axis three parameter vibration isolator.

Annular bearing support damper 60 can also be described as a three parameter device, which provides damping in multiple degrees of freedom; that is, a damping device that provides three parameter damping in all radial directions. Further emphasizing this point, FIG. 7 is a functional schematic illustrating bearing support damper 60 between a static (non-rotating) engine housing member 140 and a rotor bearing 56, which is positioned around a spool 48. Bearing support damper 60 functions as a plurality of three parameter dampers 144 circumferentially positioned around rotor bearing 56 to provide damping along substantially perpendicular axes, which are substantially orthogonal to the longitudinal axis of bearing 56 and spool 48. Each three parameter device 144 includes the following mechanical component: (i) a main spring member $K_A$ coupled between engine housing 140 and rotor bearing 56 and, therefore, the rotor assembly; (ii) a tuning spring member $K_B$ coupled between housing 140 and bearing 56 in parallel with first spring member $K_A$; and (iii) a damper $C_A$ coupled between engine housing 140 and bearing 56 in parallel with the first spring member $K_A$ and in series with the second spring member $K_B$. In the illustrated exemplary embodiment, $K_A$ is predominately or wholly determined by centering spring 64 (FIGS. 2, 3, and 5); $K_B$ is predominately or wholly determined by the combination of assembly volumetric stiffness in series with a purposeful tuning spring, including bellows 104, between annular housing assembly 62 and the engine housing; and $C_A$ is predominately or wholly determined by the damper formed by damping fluid annulus 94, the array of circumferentially-spaced damper pistons 90, and the other components of support damper 60. As compared to undamped devices and two parameter device, three parameter devices provide a significantly lower transmissibility of vibratory forces at higher frequencies. Transmissibility may be expressed by the following $$T(\omega) = \frac{X_{output}(\omega)}{X_{input}(\omega)}$$ EQ. 1 wherein $T(\omega)$ is transmissibility, $X_{output}(\omega)$ is the output motion (represented in FIG. 7 by arrows 148), and $X_{input}(\omega)$ is the input motion (represented in FIG. 7 by arrows 146), when the rotor assembly is the vibration source and the engine housing is the isolated body. Conversely, in instances wherein vibrations are transmitted from engine housing to rotor assembly (i.e., rotor assembly is the isolated body), the input motion is the motion of the engine housing imparted to support damper 60, while the output motion is the resultant excitation of the rotor assembly.

Assembly of annular bearing support damper 60 may be performed as follows. To commence, centering spring 64 (FIGS. 2 and 3) may be produced. Centering spring 64 is advantageously produced from an existing centering spring of the type utilized in conjunction with conventional spring-centered squeeze film dampers by secondary machining. In particular, the inner diameter and outer diameter of floating end portion 66 may be fined-tuned by, for example, milling; and/or fastener openings 74 (FIG. 3) may be drilled or otherwise formed through floating end portion 66 to facilitate attachment of damper pistons 90 (FIGS. 3, 5, and 6). After production of centering spring 64 (FIGS. 2 and 3), housing centerpiece 82 may then be produced by, for example, machining of an annular or ring-shaped blank. Damper pistons 90 may then be sequentially installed within radial openings 92 previously formed in housing centerpiece 82, and bellows 104 may be welded to housing centerpiece 82. Bellows 104 may also be welded to caps 102 of damper pistons 90 at this juncture or, instead, purchased from a vendor in a pre-welded state. Annular cover piece 84 (FIGS. 2 and 3) may then be positioned around housing centerpiece 82 and welded thereto to sealingly enclose annulus 94. A thermal compensator system may also be installed within a pre-existing port (not shown) and welded to housing assembly 62, as appropriate.

Continuing with the exemplary assembly process, damping fluid annulus 94 may next be filled with a damping fluid introduced into annulus 94 through fill port device 96 (FIG. 4), which may then be sealed in the manner previously described (i.e., by turning of setscrew 132 to deform copper ball 130 against conical seat 128 and thereby create a metal-to-metal seal as shown in FIG. 4). Housing assembly 62, now fully assembled and containing damper pistons 90, may then be positioned over and around floating end portion 66 of centering spring 64. Housing assembly 62 may be rotated into the proper angular orientation or clock position with respect to floating end portion 66 to align openings 74 with bores 106 provided in shafts 100 of damper pistons 90 (FIGS. 5 and 6). To complete assembly of annular bearing support damper 60, fasteners (e.g., socket head cap screws) may then utilized to secure floating end 66 of centering spring 64 to shafts 100 of damper pistons 90. After assembly of support damper 60, inner annular member or inner bearing ring 80 may be installed within the cylindrical opening provided in floating end portion 66 utilizing, for example, a thermal fit technique wherein the inner bearing ring 80 is substantially cooled prior to assembly, and then expands to form an interference fit at operational temperatures, providing a rigid connection between inner bearing ring 80 and centering spring 64. The remainder of the rotor bearing can then be assembled within centering spring 64 and around a spool (or co-axial) spools extending through bearing support damper 60. Finally, the entire assembly may positioned within the partially-constructed gas turbine engine, and annular housing assembly 62 and fixed end portion 68 of centering spring 64 secured to the engine housing. The foregoing example notwithstanding, it will be appreciated that the particular manner in which annular bearing support damper 60 is assembled and installed within a given gas turbine engine will inevitably vary amongst different embodiments.

The foregoing has thus provided exemplary embodiments of an annular bearing support damper included within a gas turbine engine that occupies a spatial envelope similar to that of a conventional spring-centered squeeze film damper, with superior damping and stiffness characteristics. The foregoing also provided an exemplary fabrication method for the manufacture of such an annular bearing support damper. While in the above-described embodiment the annular bearing damper support was fabricated independently of the rotor bearing, this need not always be the case. Instead, in further embodiments, the annular bearing damper support may be designed such that the inner circumferential surface of the floating end of the centering spring serves as the outer ring of the rotor bearing. An example of such an annular bearing support damper is described below in conjunction with FIGS. 8 and 9.

Figure 8:
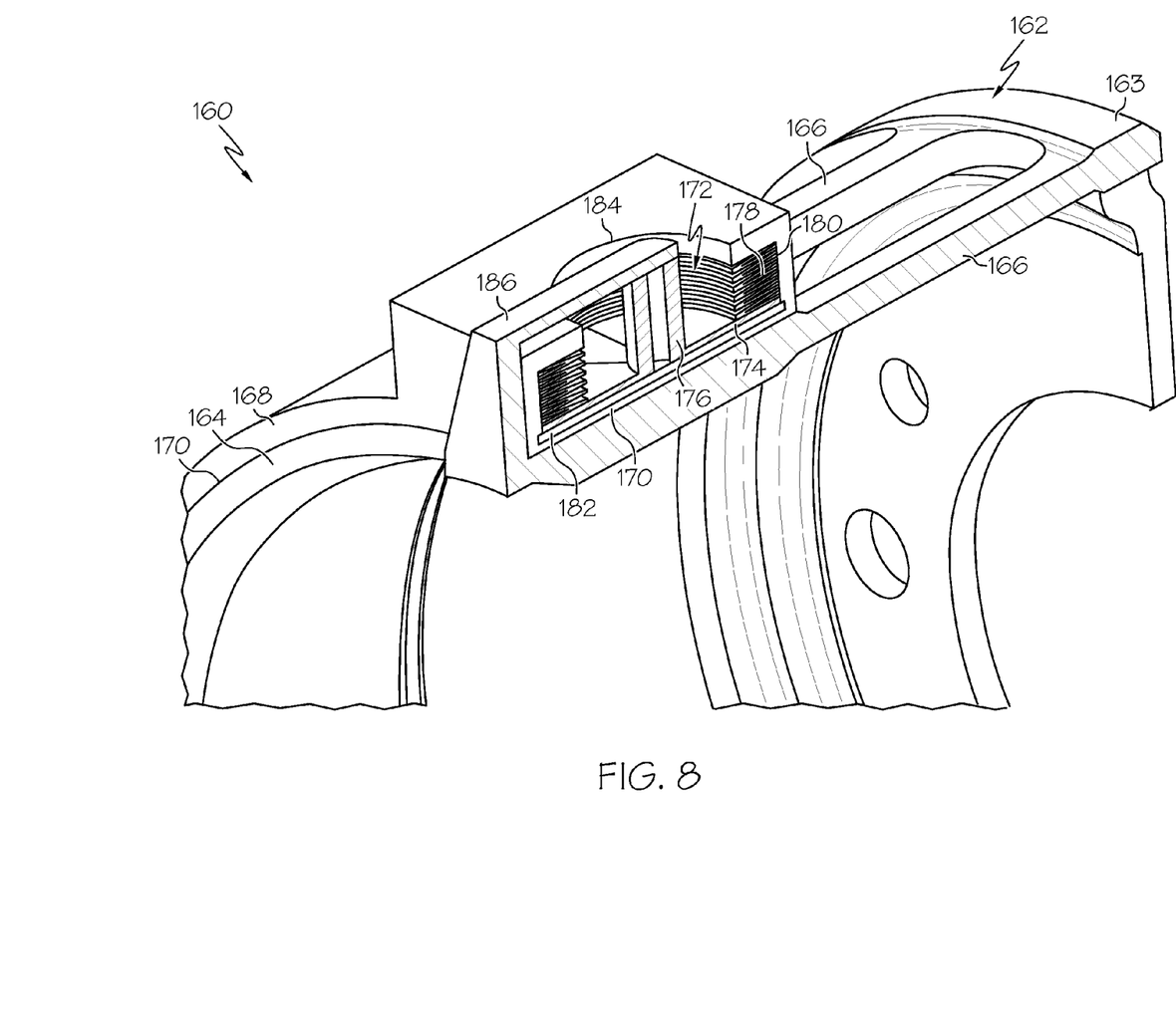
FIGS. 8 and 9 are cross-sectional views, taken along longitudinal and radial planes, respectively, of an annular bearing support damper illustrated in accordance with a further exemplary embodiment of the present invention.
Figure 9:
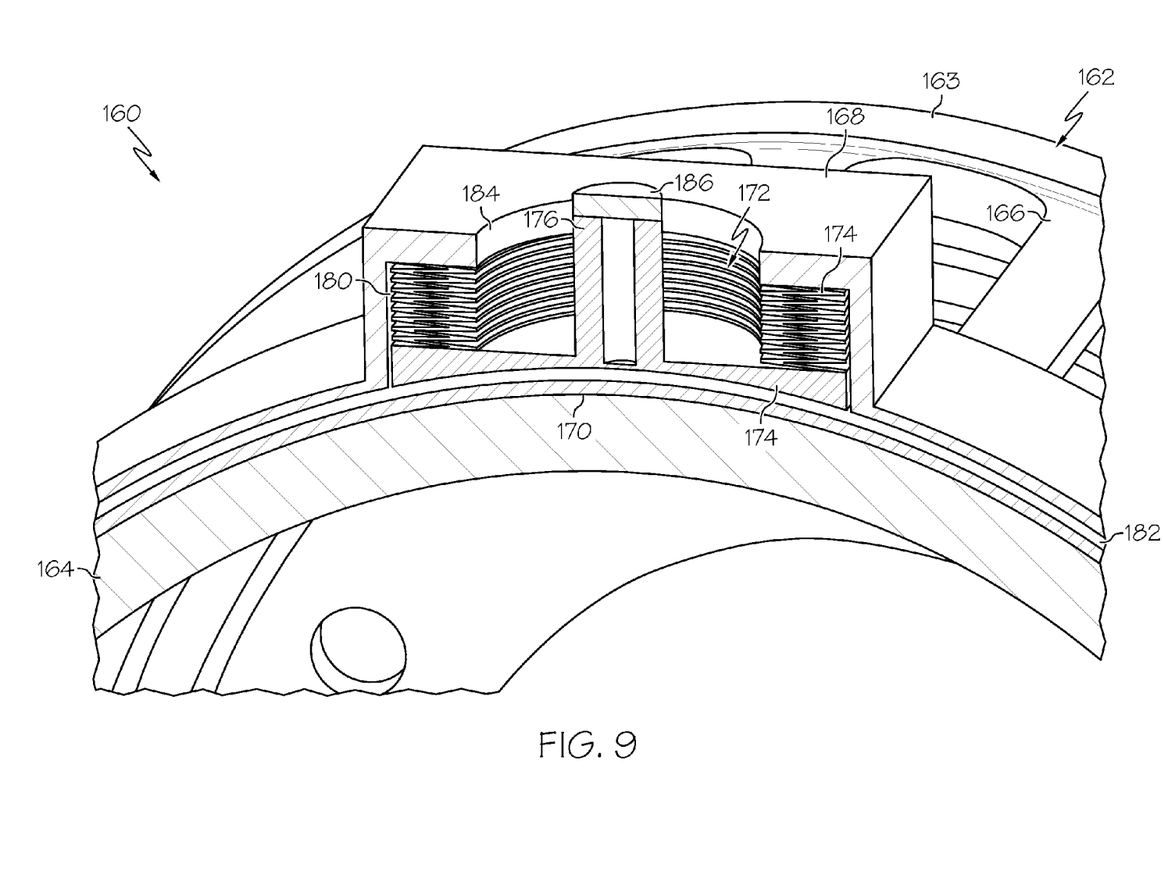

FIGS. 8 and 9 are cross-sectional views, taken along longitudinal and radial planes, respectively, of an annular bearing support damper 160 (partially shown) illustrated in accordance with a further exemplary embodiment of the present invention. In many respects, annular bearing support damper 160 is similar to annular bearing support damper 60 described above in conjunction with FIGS. 1-7. For example, annular bearing support damper 160 includes a centering spring 162 having a fixed end portion 163, a floating end portion 164, and a plurality of flex beams 166 extending between end portions 163 and 164; a damper housing assembly 168 positioned around floating end portion 164 and separated therefrom by a radial gap 170; and an array of damper pistons 172 circumferentially spaced around the longitudinal axis of support damper 160 (only one of which is shown in FIGS. 8 and 9 and describe below). As was the case previously, damper piston 172 includes an enlarged piston head or cap 174 and a piston shaft 176. Damper piston 172 is housed within a compartment 180 provided within damper housing assembly 168. A bellows 178 sealingly couples damper piston 172 to damper housing assembly 168. In particular, a first end of bellows 178 is sealingly joined (e.g., circumferentially welded) to an inner surface of compartment 180, while the opposing end of bellows 178 is sealingly joined (e.g., circumferentially welded) to the underside of piston cap 174. Piston cap 174 fluidly communicates and bounds an outer circumferential portion of a damping fluid annulus 182 provided within damper housing assembly 168.

As were damper pistons 90 included within support damper 60, damper pistons 172 are fixedly coupled to floating end portion 164 of centering spring 162. However, in contrast to damper pistons 90 described above in conjunction with FIGS. 3, 5, and 6, damper pistons 172 are not connected to floating end portion 164 through the inner ring member of end portion 164. Instead, piston shaft 176 extends radially outward from piston cap 174 and through a radial opening 184 provided in damper housing assembly 168. A connector arm 186 (e.g., a substantially L-shaped extension) extending from floating end portion 164 is then attached to the protruding end of piston shaft 176. In this manner, the formation of openings (e.g., openings 74 shown in FIGS. 2, 3, 5, and 6) through the inner circumferential surface of floating end portion 164 is avoided, which allows the inner circumferential surface of floating end portion 164 to serve as the outer raceway of a rolling element bearing (not shown) installed within floating end portion 164 of centering spring 162.

The foregoing has thus provided embodiments of an annular support bearing support damper. The above-described bearing support damper does not require an active lubricant supply and consequently reduce the overall cost, part count, and complexity of a gas turbine engine as compared to a conventional squeeze film damper. As further advantage, the above-described annular bearing support damper can be tuned to provide substantially linear damping and stiffness profiles over the operational frequency range of a gas turbine engine. The annular bearing support damper also allows independent tuning of stiffness and damping profiles. The bearing support damper is thus able to significantly reduce the transmission of rotor-emitted vibrations to the engine housing, and therefore to the aircraft fuselage, over the full operational range of the gas turbine engine and even when operated at or through critical modes. As a still further advantage, the above-described bearing support damper provides high, predictable, and linear stiffnesses to minimize displacement of the rotor assembly and provide improved centerline control. This, in turn, allows the gas turbine engine to be designed to better counteract static loading conditions (e.g., gravity sag or maneuver loading) and to boost engine performance by reducing tip clearances. While described above in conjunction with a gas turbine engine, it is emphasized that embodiments of the annular support damper are also suitable for usage within other types of rotating machines, including turbochargers and turbomachinery generally.

While at least one exemplary embodiment has been presented in the foregoing Detailed Description, it should be appreciated that a vast number of variations exist. It should also be appreciated that the exemplary embodiment or exemplary embodiments are only examples, and are not intended to limit the scope, applicability, or configuration of the invention in any way. Rather, the foregoing Detailed Description will provide those skilled in the art with a convenient road map for implementing an exemplary embodiment of the invention. It being understood that various changes may be made in the function and arrangement of elements described in an exemplary embodiment without departing from the scope of the invention as set-forth in the appended claims.

What is claimed is:
1. A gas turbine engine, comprising:
an engine housing;
a rotor assembly disposed within the engine housing;

a rotor bearing supporting the rotor assembly within the engine housing; and an annular bearing support damper positioned between the rotor bearing and the engine housing, the annular bearing support damper comprising:
- an annular housing assembly fixedly coupled to the engine housing;
- a damping fluid annulus formed within the annular housing assembly and fillable with a damping fluid; and
- an array of circumferentially-spaced damper pistons comprising a plurality of piston caps and bellows, the piston caps sealingly coupled to the annular housing assembly by the bellows and in fluid communication with the damping fluid annulus, the piston caps further fixedly coupled to the rotor bearing and moving in conjunction therewith to force the flow of damping fluid around the damping fluid annulus during operation of the gas turbine engine to reduce the transmissions of vibrations to the engine housing;

wherein the annular housing assembly comprises:
- a circumferential wall bounding the damping fluid annulus; and
- a plurality of radial openings formed in the circumferential wall and accommodating the array of circumferentially-spaced damper pistons.

2. A gas turbine engine according to claim 1 wherein the annular bearing support damper circumscribes the rotor bearing.

3. A gas turbine engine according to claim 1 wherein the annular bearing support damper further comprises a centering spring having a fixed end portion coupled to the engine housing and having a floating end portion fixedly coupled to the array of circumferentially-spaced damper pistons and to the rotor bearing.

4. A gas turbine engine according to claim 3 wherein the rotor assembly comprises a spool extending through the centering spring and through the annular bearing support damper.

5. A gas turbine engine according to claim 3 wherein the floating end portion is disposed between the annular bearing support damper and the rotor bearing.

6. A gas turbine engine according to claim 5 wherein the annular housing assembly is separated from the floating end portion by a radial gap to permit relative radial movement between the annular housing assembly and the floating end portion.

7. A gas turbine engine according to claim 3 wherein the annular bearing support damper is a three parameter device.

8. A gas turbine engine according to claim 1 wherein the array of circumferentially-spaced pistons is at least partially contained within the annular housing assembly.

9. A gas turbine engine according to claim 1 wherein the plurality of piston caps normally reside within the plurality of radial openings, and wherein the outer circumferential edge of each piston cap is separated from the inner circumferential edge of its corresponding radial opening by a circumferential clearance to accommodate lateral movement.

10. A gas turbine engine according to claim 1 wherein the plurality of pistons caps are substantially flush with the circumferential wall bounding the damping fluid annulus when the annular bearing support damper resides in a centered position.

11. A gas turbine engine according to claim 1 further comprising a centering spring having a fixed end portion coupled to the engine housing and having a floating end portion fixedly coupled to the array of circumferentially-spaced damper pistons and to the rotor bearing;
wherein the array of circumferentially-spaced damper pistons further comprises a plurality of piston shafts each having a first end fixedly coupled to one of the plurality of piston caps and a second end fixedly coupled to the floating end portion of the centering spring.

12. A gas turbine engine according to claim 1 wherein the plurality of bellows are externally pressurized.

13. A gas turbine engine according to claim 1 wherein the array of circumferentially-spaced damper pistons comprises four damper pistons positioned around the circumference of the annular housing assembly at substantially 90 degree intervals.

14. An annular bearing support damper, comprising:
- an annular housing assembly having a damping fluid annulus fillable with a damping fluid;
- a centering spring around which the annular housing assembly extends; and
- an array of circumferentially-spaced damper pistons, each comprising:
  - a piston cap in fluid communication with the damping fluid annulus;
  - a bellows sealingly coupled between the piston cap and the annular housing assembly such that the bellows deflects as the piston cap moves with respect to the annular housing assembly to force the flow of damping fluid around the damping fluid annulus and dampen vibrations during usage of the annular bearing support damper; and
  - a piston shaft extending through the bellows to fixedly couple the piston cap to the centering spring.

15. An annular bearing support damper according to claim 14 wherein the annular housing assembly comprises a ring portion circumferentially bounding the damping fluid annulus, and wherein each piston cap comprises a working surface that is substantially flush with the ring portion when the annular bearing support damper resides in a centered position with respect to the centering spring.

16. An annular bearing support damper according to claim 14 wherein each piston cap comprises a working surface having a sloped outer geometry.

* * * * *